United States Patent
Li

(10) Patent No.: US 9,420,145 B2
(45) Date of Patent: Aug. 16, 2016

(54) SYSTEM AND METHOD FOR TONE MAPPING OF IMAGES

(71) Applicant: Marvell World Trade Ltd., St. Michael (BB)

(72) Inventor: Huai Dong Li, Cupertino, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/572,093

(22) Filed: Dec. 16, 2014

(65) Prior Publication Data

US 2015/0201109 A1    Jul. 16, 2015

Related U.S. Application Data

(60) Provisional application No. 61/926,673, filed on Jan. 13, 2014.

(51) Int. Cl.
| | |
|---|---|
| *H04N 1/407* | (2006.01) |
| *H04N 9/04* | (2006.01) |
| *G06T 5/40* | (2006.01) |
| *G06K 9/46* | (2006.01) |
| *G06K 9/36* | (2006.01) |
| *G06T 5/00* | (2006.01) |

(52) U.S. Cl.
CPC .............. *H04N 1/4074* (2013.01); *G06T 5/007* (2013.01); *G06T 5/40* (2013.01); *H04N 1/4072* (2013.01); *H04N 9/045* (2013.01); *G06T 2207/20021* (2013.01)

(58) Field of Classification Search
CPC . G06K 9/4642; G06K 9/4671; G06K 9/4652; G06K 9/4604; G06K 9/36; H04N 1/46; H04N 5/2355; H04N 5/2356; H04N 1/4074; H04N 1/4072; H04N 9/045; G06T 2207/20021; G06T 5/007; G06T 5/40
USPC .............. 348/222.1, 234, 254, 666, 652, 672; 382/164–167, 168, 171, 173, 220, 274; 358/520, 522; 345/589, 617
See application file for complete search history.

(56) References Cited

U.S. PATENT DOCUMENTS

| | | | |
|---|---|---|---|
| 2006/0077490 A1* | 4/2006 | Sheraizin ................ | G06T 5/009 358/519 |
| 2007/0121094 A1* | 5/2007 | Gallagher .......... | G06K 9/00201 356/4.03 |
| 2007/0268534 A1* | 11/2007 | Duan ...................... | G06T 5/007 358/520 |
| 2009/0067713 A1* | 3/2009 | Chen .................... | H04N 1/4074 382/169 |
| 2010/0195901 A1 | 8/2010 | Andrus et al. | |

(Continued)

OTHER PUBLICATIONS

International Search Report & Written Opinion mailed Mar. 18, 2015 in related/corresponding International PCT Patent Appl. No. PCT/US14/70568 filed Dec. 16, 2014.

(Continued)

*Primary Examiner* — Tuan Ho
*Assistant Examiner* — Marly Camargo

(57) ABSTRACT

A method and imaging device are provided. An image is divided into N zones, and a histogram is generated for each of the N zones. A tone curve is determined for each of the N zones, where tone curve parameters including the controlling of shape and transition point of the curve are based on the histogram of each zone. A tone-mapped value for each pixel of the image is determined based on a sum of M weighted values determined by applying tone curves of M zones to a value of the pixel.

16 Claims, 9 Drawing Sheets

(56) References Cited

U.S. PATENT DOCUMENTS

| | | | |
|---|---|---|---|
| 2011/0254976 A1* | 10/2011 | Garten | G06F 3/1454 348/229.1 |
| 2012/0082397 A1* | 4/2012 | Zhai | G06T 5/50 382/274 |
| 2012/0113130 A1* | 5/2012 | Zhai | G06T 5/008 345/589 |
| 2012/0201453 A1* | 8/2012 | Furuya | H04N 1/6027 382/167 |
| 2012/0224788 A1* | 9/2012 | Jia | H04N 5/235 382/274 |

OTHER PUBLICATIONS

Lujik et al., "Re: HELP: Equation for a Contrast Curve (with precise location of the turning point)." In the Luminous Landscape discussion forum [online].Mar. 19, 2011 [online][retrieved on Feb. 18, 2015]. Retrieved from the Internet: <URL:http://forum.luminous-landscape.com/index.php?topic=52364.0>.

\* cited by examiner

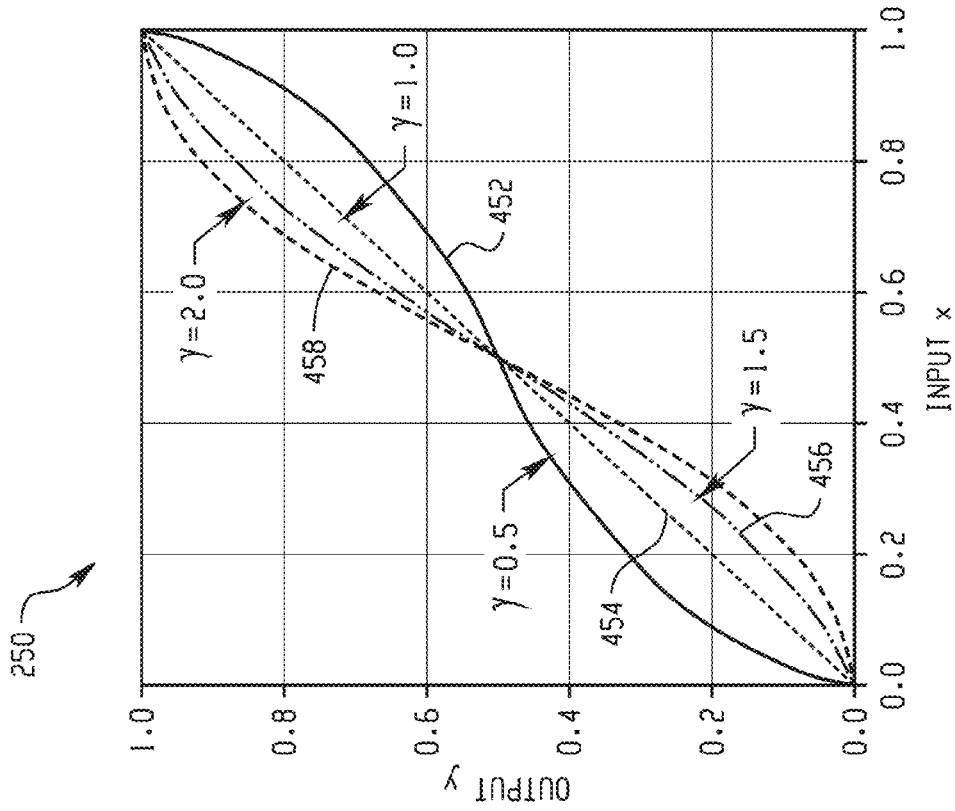
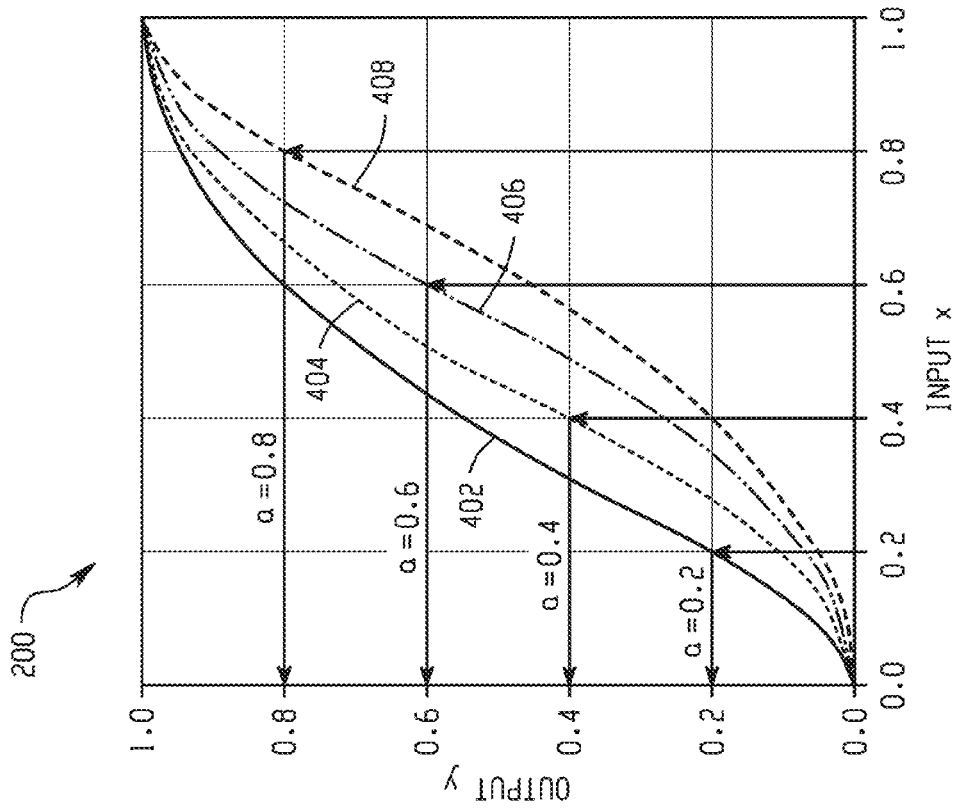
Fig. 2A
Fig. 2B

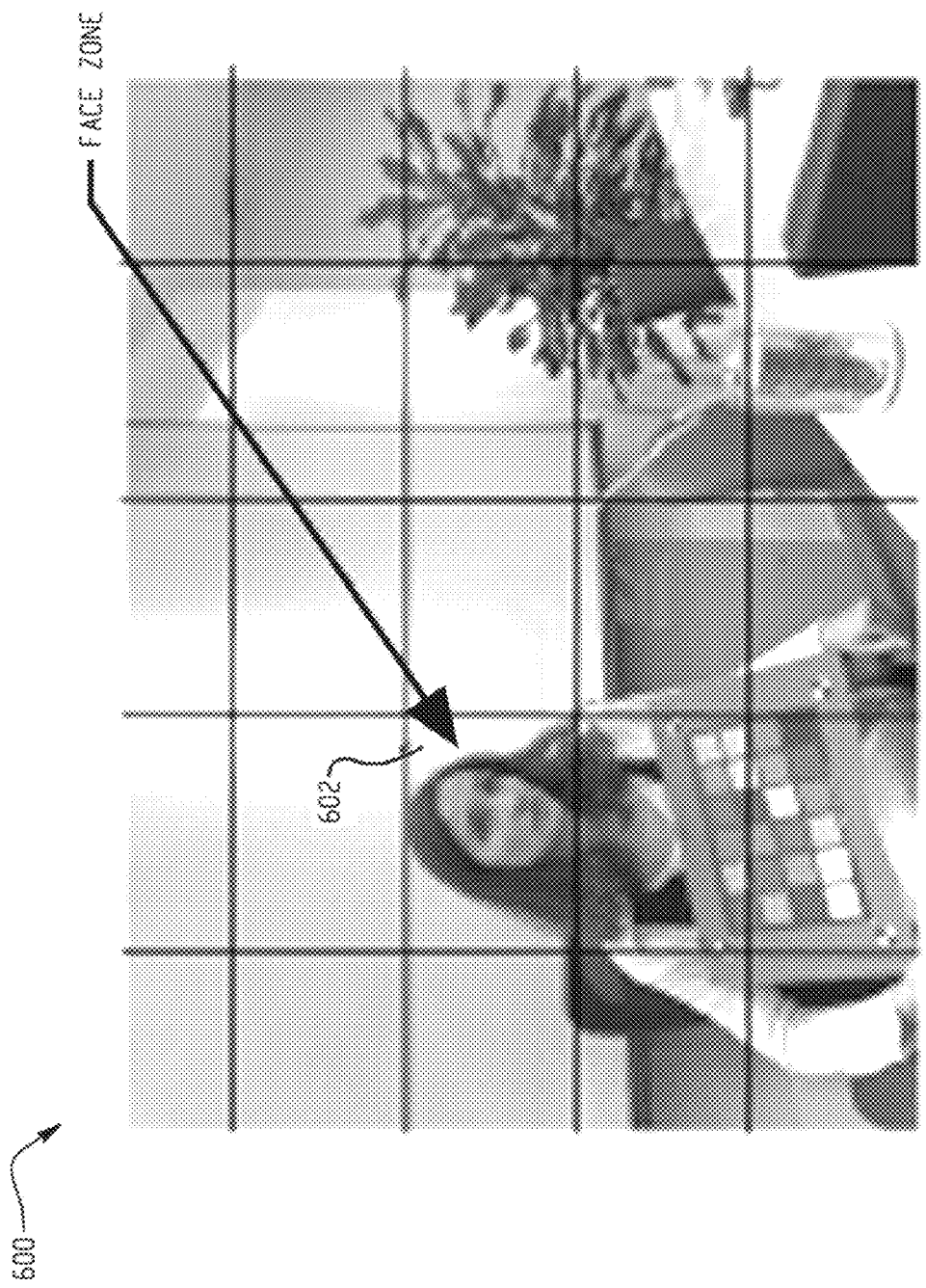

SYSTEM AND METHOD FOR TONE MAPPING OF IMAGES

CROSS-REFERENCE TO RELATED APPLICATIONS

This disclosure claims priority to U.S. Provisional Patent Application No. 61/926,673, filed on Jan. 13, 2014, which is incorporated herein by reference in its entirety.

TECHNICAL FIELD

The technology described in this document relates generally to image signal processing (ISP) methods and more particularly to systems and methods for tone mapping of images.

BACKGROUND

Semiconductor image sensors are used to sense radiation that includes, for example, visible light. Complementary metal-oxide-semiconductor (CMOS) image sensors and charge-coupled device (CCD) sensors are widely used in digital cameras and mobile phone cameras. These sensors utilize an array of pixels located in a substrate, where the pixels include photodiodes and transistors. The pixels absorb radiation projected toward the substrate and convert the absorbed radiation into electrical signals, and these electrical signals are used in forming digital images. Tone mapping techniques may be used in transforming digital images to produce images that are more visually appealing to a viewer. Tone mapping techniques are used, generally, to map one set of colors or image characteristics to another set of values.

SUMMARY

The present disclosure is directed to an imaging device and a method of processing an image. In an example method of processing an image, an image is divided into N zones. A histogram is generated for each of the N zones. A tone curve is determined for each of the N zones, where each of the tone curves is determined based on the histogram for the zone. A tone-mapped value for each pixel of the image is determined based on a sum of M weighted values determined by applying tone curves of M zones to a value of the pixel.

In another example, an imaging device includes a pixel array and a processor for processing pixel output signals received from the pixel array. The processor is configured to divide an image into N zones and generate a histogram for each of the N zones. The processor is further configured to determine a tone curve for each of the N zones, where each of the tone curves is determined based on the histogram for the zone. The processor is also configured to determine a tone-mapped value for each pixel of the image based on a sum of M weighted values determined by applying tone curves of M zones to a value of the pixel.

BRIEF DESCRIPTION OF THE FIGURES

FIGS. 2A and 2B depict example S-shaped tone curves.

FIG. 6 depicts a dividing of an image into N zones and a detection of a face zone included in the N zones.

DETAILED DESCRIPTION

Figure 1A:
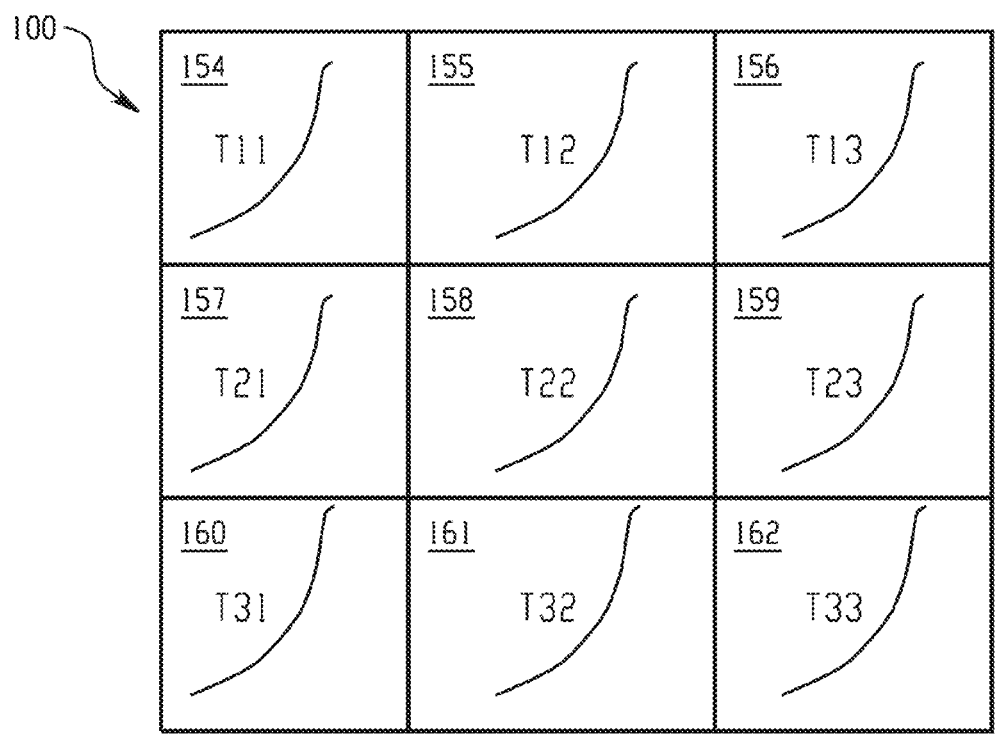
FIG. 1A depicts an image divided into a plurality of zones.

FIG. 1A depicts an image 100 divided into a plurality of zones 154-162. In an example, the image 100 is a digital image captured with a personal electronic device, such as a digital camera, digital video camera, smartphone, mobile device (e.g., tablet computer, etc.), or other imaging device. In capturing a scene, these devices may produce digital images having a linear mapping between scene radiance and pixel intensity. For this reason and others, the digital images produced by these devices may be visually unappealing. To render these digital images more visually appealing, the tone mapping techniques described herein are applied. In general, tone mapping is a technique used in image processing to map one set of colors or image characteristics to another set of values.

The tone mapping techniques described herein utilize a local tone mapping method, rather than a global tone mapping method. Global tone mapping methods apply a single tone curve to all pixels of an image. A tone curve is a function that maps original pixel values of an image to new pixel values and may be based on, for example, a power function, a logarithmic function, a sigmoidal (i.e., S-shaped) function, or another function (e.g., a function that is image dependent). In the global tone mapping methods, one input value results in one and only one output value. By contrast, in the local tone mapping method described herein, one input value may result in multiple different tone-mapped output values, with the tone-mapped output values varying based on a spatial location of a pixel being transformed.

As an example of the local processing used in the local tone mapping method, a first pixel is located at a first location of the image 100, and a second pixel is located at a second location of the image 100. The second location is different from the first location. The first and second pixels each have a same pixel value $x_1$. The local tone mapping method is applied to the first pixel, with the pixel value $x_1$ being processed to generate a tone-mapped value $y_1$ for the first pixel. The local tone mapping method is further applied to the second pixel, with the pixel value $x_1$ being processed to generate a tone-mapped value $y_2$ for the second pixel. Due to the local processing methods applied, the tone-mapped value $y_2$ is different from $y_1$.

Figure 3:
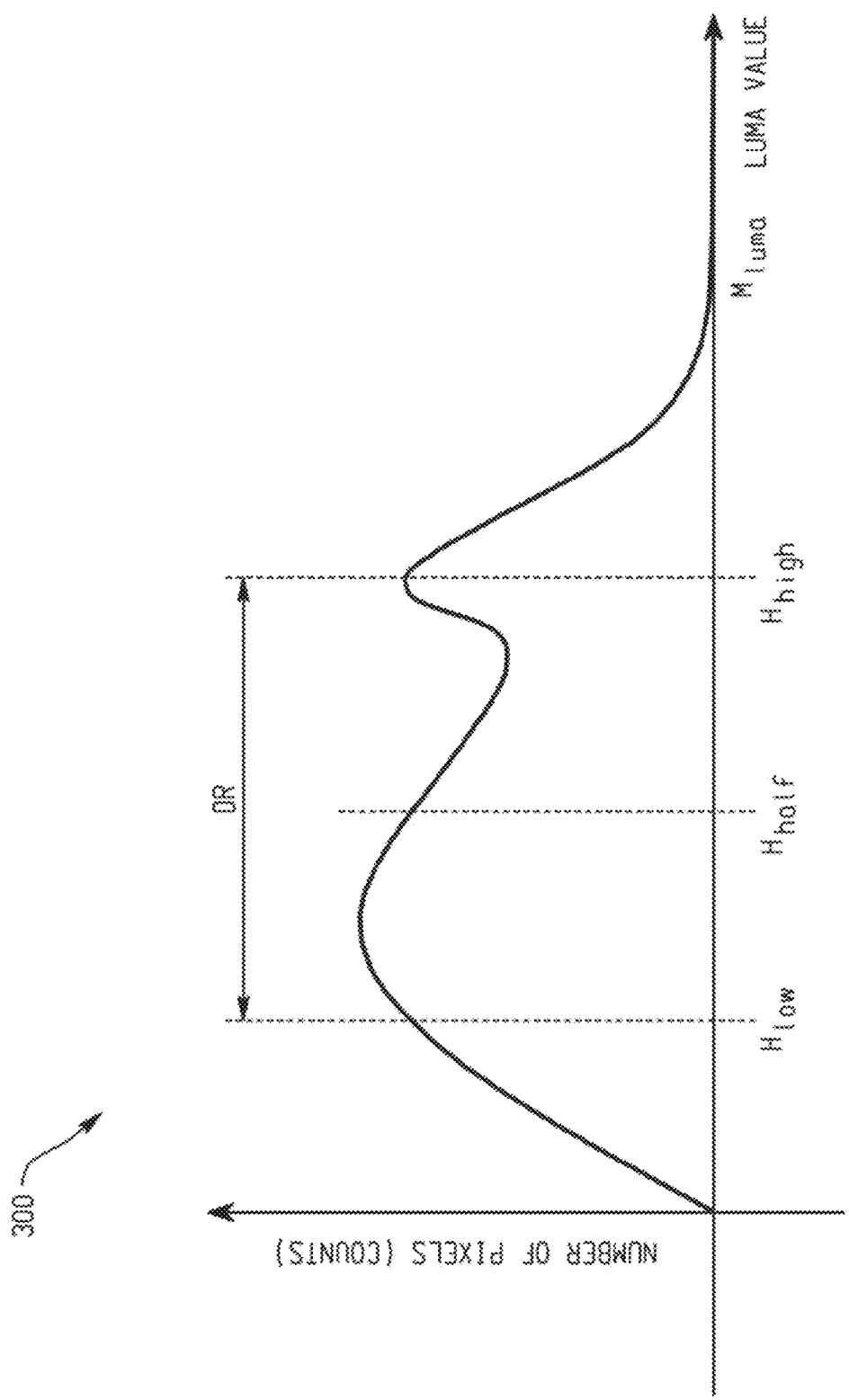
FIG. 3 depicts an example luma histogram for a zone that is used in determining a tone curve for the zone.

To apply the local tone mapping method to the image 100 of FIG. 1A, the image 100 is divided into N zones 154-162. In the example of FIG. 1A, N is equal to nine, and the image 100 is thus divided into the nine non-overlapping zones 154-162 depicted in the figure. For each of the N zones 154-162, a histogram of the luma components of the pixels that form the zone is generated. A luma component for a pixel indicates an intensity or brightness of the pixel. The resulting luma histogram for each zone is a representation of the frequency of occurrence of each intensity or brightness value for pixels in the zone. An example luma histogram 300 is depicted in FIG. 3 and described in further detail below. It should be understood that the luma histogram generated for each of the N zones 154-162 need not include a graphical representation. In an example, the luma histogram for a zone includes only data (e.g., luma values and corresponding pixel counts) from which statistics of the histogram are calculated.

For each of the N zones 154-162, a local tone curve is determined. As explained above, a tone curve is a function that maps original pixel values of an image to new pixel values. In the image 100, a first zone 154 is associated with a first local tone curve $T_{11}$, a second zone 155 is associated with a second local tone curve $T_{12}$, and so on. Each of the different tone curves $T_{11}$-$T_{33}$ associated with the zones 154-162 may have different parameters that are based on the local image statistics for each of the zones 154-162. Specifically, as described in further detail below with reference to FIG. 3, each of the tone curves is determined based on the luma histogram for the zone. Thus, for the first zone 154, the first local tone curve $T_{11}$ is based on the luma histogram for the first zone 154, and for the second zone 155, the second local tone curve $T_{12}$ is based on the luma histogram for the second zone 155, and so on.

After determining the tone curves for each of the zones 154-162, tone-mapped values for each of the pixels in the image 100 are determined. As described in further detail below with reference to FIGS. 5A and 5B, the determining of a tone-mapped value for a pixel of the image 100 is based on a sum of M weighted values. The M weighted values are determined by applying tone curves of M zones to a value of the pixel. Determining a single weighted value of the M weighted values includes i) applying to the value of the pixel a tone curve for a particular zone to determine a non-weighted value, and ii) weighting the non-weighted value based on a distance from the pixel to a center point of the particular zone and an intensity difference between the value of the pixel and an average pixel value of the particular zone. The applying and weighting steps are performed for each of the M zones to determine the M weighted values for the pixel. The tone-mapped value for the pixel is based on the sum of the M weighted values, with the sum being normalized as described below with reference to FIGS. 5A and 5B. The M zones include a first one of the N zones 154-162 in which the pixel is located and one or more other zones of the N zones 154-162 that are within a neighborhood of the first zone.

Figure 1B:
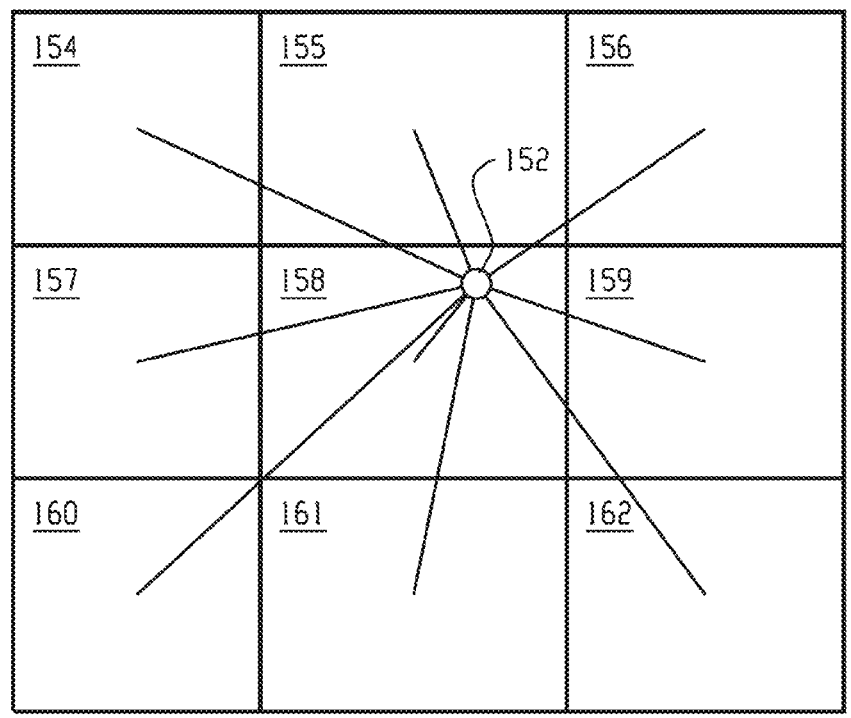
FIG. 1B depicts a determining of a tone-mapped value for a pixel of the image based on a sum of M weighted values.
Figure 5A:
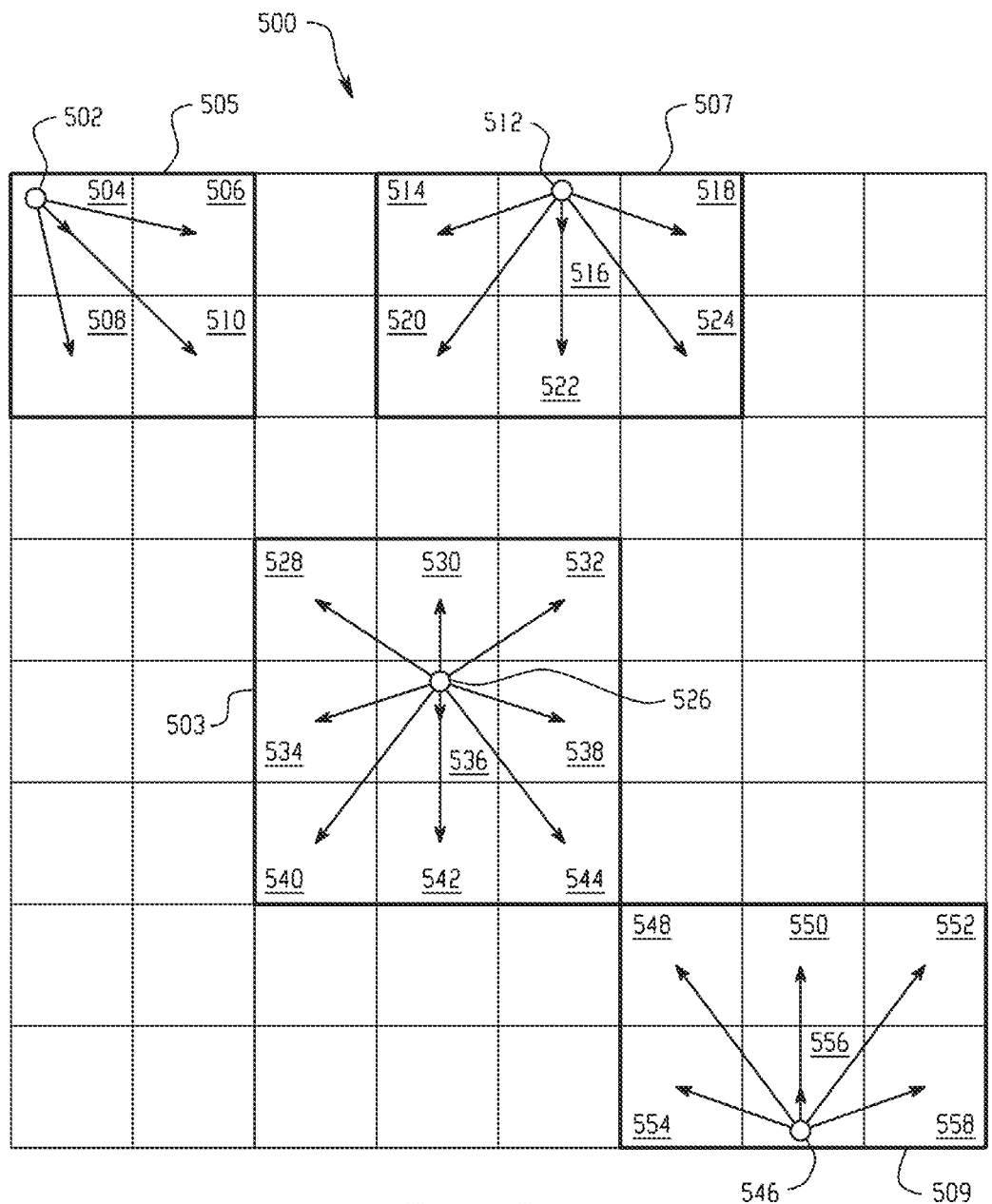
FIG. 5A depicts an image including pixels, where tone-mapped values are determined for each of the pixels based on a sum of M weighted values.
Figure 5B:
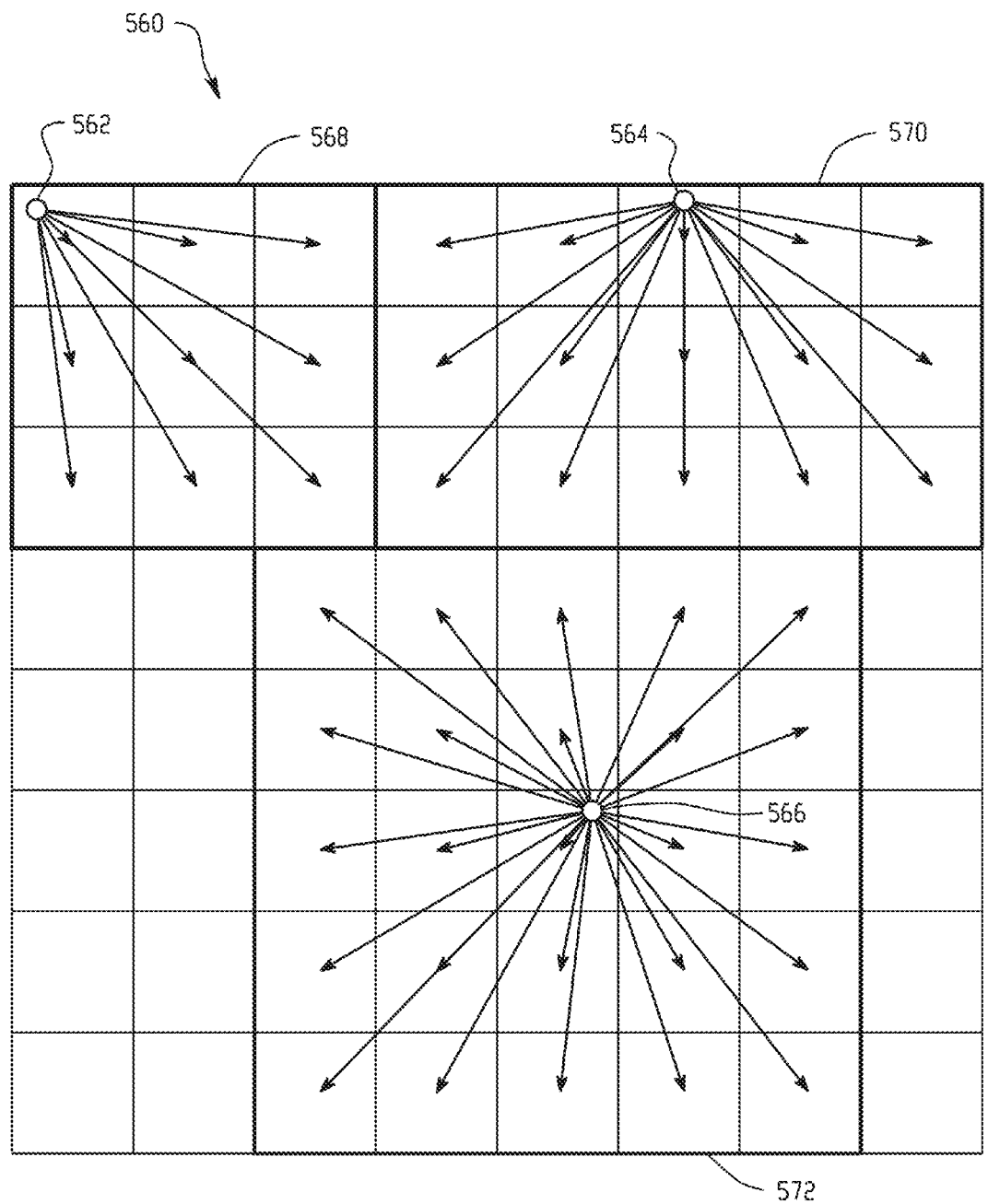
FIG. 5B depicts an image divided into an 8 zone×8 zone matrix, where 5 zone×5 zone neighborhoods are used in determining the tone-mapped values for pixels of the image.

To illustrate the determining of a tone-mapped value for a pixel of the image 100, FIG. 1B depicts a pixel 152 located within a zone 158 of the image. The determining of a tone-mapped value for the pixel 152 is based on a sum of M weighted values. In the example of FIG. 1B, M is equal to N, but it should be understood that in other examples, M is less than N. Such other examples are illustrated in FIGS. 5A and 5B and described in detail below. The M weighted values are determined by applying tone curves of M zones to a value of the pixel 152. In the example of FIG. 1B, with M equal to N, tone curves for all of the N zones 154-162 are applied to the value of the pixel 152. To determine a first weighted value of the M weighted values, a tone curve for the zone 158 is applied to the value of the pixel 152 to determine a first non-weighted value. The first non-weighted value is weighted based on i) a distance from the pixel 152 to a center point of the zone 158, and ii) an intensity difference between the value of the pixel 152 and an average pixel value of the zone 158. The weighting of the first non-weighted value yields the first weighted value of the M weighted values.

Similarly, to determine a second weighted value of the M weighted values, a tone curve for the zone 154 is applied to the value of the pixel 152 to determine a second non-weighted value. The second non-weighted value is weighted based on a distance from the pixel 152 to a center point of the zone 154 and an intensity difference between the value of the pixel 152 and an average pixel value of the zone 154. The rest of the M weighted values for the pixel 152 are determined by repeating these steps for the remaining zones (i.e. zones 155-157 and 159-162). The tone-mapped value for the pixel 152 is determined based on a sum of the M weighted values.

In determining the tone-mapped value for the pixel 152, tone curves for a neighborhood of zones are applied to the value of the pixel 152. Although the example of FIG. 1B utilizes a "3 zone×3 zone" neighborhood, it should be understood that other types of neighborhoods are used in other examples. In another example, the image 100 is divided into an 8 zone×8 zone matrix, and neighborhoods used in determining the tone-mapped values are 3 zone×3 zone neighborhoods or 5 zone×5 zone neighborhoods, for example. Such an 8×8 zone matrix with 3×3 and 5×5 zone neighborhoods are illustrated in FIGS. 5A and 5B, respectively.

The local tone mapping method described herein is used for a variety of purposes, such as reproducing color images captured with a normal sensor for a visually pleasing display. Although the described systems and methods are said to implement a "local tone mapping method," it should be understood that if the image 100 is considered to comprise a single zone (i.e., the image 100 is not divided into multiple zones), then the systems and methods implement a global tone mapping method.

FIGS. 2A and 2B are graphs 200, 250, respectively, showing example S-shaped tone curves having different parameter values. As explained above, a tone curve applied in a tone mapping method may be based on, for example, a power function, a logarithmic function, a sigmoidal function, or another function. In an example of the approach described herein, an S-shaped curve function is used. An example S-shaped tone curve for a particular zone is $$T = \begin{cases} y = a^{1-\gamma} x^{\gamma}, & 0 \leq x \leq a, \\ y = 1 - (1-a)^{1-\gamma}(1-x)^{\gamma}, & a < x \leq 1 \end{cases}, \quad \text{(Equation 1)}$$

where x is a value of a pixel to which the tone curve is applied, γ is an output value of the tone curve, and a and γ are parameters of the tone curve. In the systems and methods described herein, each zone of an image has its own tone curve with a and γ parameters determined specifically for the zone. In considering a particular zone of the image, the parameters a and γ of the tone curve are set based on a determination that the particular zone is over-exposed, under-exposed, or of normal exposure. This is described in further detail below with reference to FIG. 3.

In Equation 1, the parameter a controls the transition point in the piecewise function T, and the parameter γ controls the shape of the tone curve. If γ is equal to 1.0, then the tone curve is a linear curve with the output value y being equal to the value x of the pixel. FIG. 2A is a graphical depiction of the S-shaped tone curve described by Equation 1. In FIG. 2A, the value γ is equal to 2.0 for all curves, and a first tone curve 402 has a value of a equal to 0.2, a second tone curve 404 has a value of a equal to 0.4, a third tone curve 406 has a value of a equal to 0.6, and a fourth tone curve 408 has a value of a equal to 0.8. FIG. 2B is another graphical depiction of the S-shaped tone curve described in Equation 1. In FIG. 2B, the value a is equal to 0.5 for all curves, and a first tone curve 452 has a value of γ equal to 0.5, a second tone curve 454 has a value of γ equal to 1.0, a third tone curve 456 has a value of γ equal to 1.5, and a fourth tone curve 458 has a value of γ equal to 2.0.

FIG. 3 depicts an example luma histogram 300. In the local tone mapping method described herein, an input image is divided into N zones, and each of the N zones has its own tone curve. As explained above with reference to FIGS. 2A and 2B, parameters a and γ for a tone curve of a particular zone are set based on a determination that the particular zone is over-exposed, under-exposed, or of normal exposure. This determination is made based on a luma histogram for the particular zone. FIG. 3 depicts the example luma histogram 300 that is associated with a particular zone of an input image. An x-axis of the luma histogram 300 represents different luma values (i.e., brightness or intensity values), and a y-axis represents a number of pixels. Thus, the luma histogram 300 shows a count of the pixels in the zone having each of the different luma values represented on the x-axis. A luma value $M_{luma}$ on the x-axis represents a maximum luma value of the input data (i.e., a maximum luma value of the entire input image, as opposed to a maximum luma value of the particular zone), and the luma histogram 300 shows that the particular zone includes only a small number of pixels having this maximum luma value.

The determination of whether the particular zone is over-exposed, under-exposed, or of normal exposure includes determining a normalized average luma value $YN_{avg}$ for the particular zone based on the luma histogram 300. The value $YN_{avg}$ is equal to an average luma value $Y_{avg}$ of the zone normalized by the maximum luma value $M_{luma}$ of the input data:

$$YN_{avg}=Y_{avg}/M_{luma} \quad \text{(Equation 2)}$$

The average luma value $Y_{avg}$ used in determining the value $YN_{avg}$ is determined from the luma histogram 300 for the particular zone.

If $YN_{avg}$ is greater than a first threshold value (e.g., a threshold "overEx_thre" referred to herein), the particular zone is determined to be over-exposed. Then, in setting the parameters a and γ for the tone curve of the particular zone, the parameter a is set equal to approximately 1.0 (e.g., 0.9), and the parameter γ is set equal to a value greater than 1.0 (e.g., 1.1). In an example, the parameter a is approximately equal to 1.0 if the parameter a has a value between 0.80 and 1.20.

If $YN_{avg}$ is less than a second threshold value (e.g., a threshold "underEx_thre" referred to herein), the particular zone is determined to be under-exposed. Then, in setting the parameters a and γ for the tone curve of the particular zone, the parameter a is set equal to approximately 0.0 (e.g., 0.02), and the parameter γ is set equal to a value greater than 1.0 (e.g., 1.1). In an example, the parameter a is approximately equal to 0.0 if the parameter a has a value between 0.00 and 0.20.

The particular zone is determined to be of normal exposure if the zone is not determined to be over-exposed, and the zone is not determined to be under-exposed. If the particular zone is of normal exposure, the parameter a for the tone curve of the zone is set equal to ($H_{half}/M_{luma}$). $H_{half}$ is a 50-percentile luma value, where fifty percent of the pixels in the particular zone have a luma value that is less than or equal to the 50-percentile luma value (i.e., $H_{half}$ is a luma value where the histogram reaches percentile 50%). $M_{luma}$ is the maximum luma value for the whole input data, as noted above. The value $H_{half}$ is determined from the luma histogram 300 for the particular zone.

Additionally, if the particular zone is of normal exposure, it is determined, based on the luma histogram 300 for the particular zone, whether the zone has a wide dynamic range, a narrow dynamic range, or a normal dynamic range. The parameter γ is set based on this determination. Specifically, if the particular zone is of normal exposure, a value DR is determined from the luma histogram 300, and the determining of whether the particular zone has the wide dynamic range, the narrow dynamic range, or the normal dynamic range is based on the value DR. The value DR is a difference between a low-end histogram point, $H_{low}$, and a high-end histogram point, $H_{high}$. $H_{low}$ is a q-percentile luma value where the histogram 300 reaches a predefined percentile q % (i.e., $H_{low}$ is the q-percentile luma value, where q percent of the pixels in the particular zone have a luma value that is less than or equal to the q-percentile luma value). An example $H_{low}$ value is depicted on the example luma histogram 300 of FIG. 3, which shows the $H_{low}$ luma value that is less than the $H_{half}$ luma value. $H_{high}$ is a (100−q)-percentile luma value where the histogram 300 reaches a predefined percentile (100−q) % (i.e., $H_{high}$ is the (100−q)-percentile luma value, where (100−q) percent of the pixels in the particular zone have a luma value that is less than or equal to the (100−q)-percentile luma value).

Using the DR value, it is determined whether the particular zone has a wide dynamic range, a narrow dynamic range, or a normal dynamic range, and based on this determination, the tone curve parameter γ for the particular zone is set. Specifically, the particular zone is determined to have a wide dynamic range and γ is set equal to $\gamma_{min}$ if DR is greater than $DR_{max}$. $\gamma_{min}$ is a predetermined minimum value for γ, and $DR_{max}$ is a predetermined maximum threshold value for DR. The particular zone is determined to have a narrow dynamic range and γ is set equal to $\gamma_{max}$ if DR is less than $DR_{min}$. $\gamma_{max}$ is a predetermined maximum value for γ, and $DR_{min}$ is a predetermined minimum threshold value for DR. Setting γ equal to $\gamma_{max}$ avoids the over-amplification of noise. In an example, for a flat area like a wall, $\gamma_{max}$ is set to 1.0. Further, in another example, $\gamma_{max}$ is set based on an analog gain applied so that $\gamma_{max}$ is a small value for a low light scene with high gain.

The particular zone is determined to have a normal dynamic range if the zone is not determined to have the wide dynamic range, and the zone is not determined to have the narrow dynamic range. If the particular zone is determined to have the normal dynamic range, γ is set equal to $$\frac{(DR - DR_{max}) * (\gamma_{max} - \gamma_{min})}{(DR_{max} - DR_{min})} + \gamma_{min}. \quad \text{(Equation 3)}$$

Figure 4:
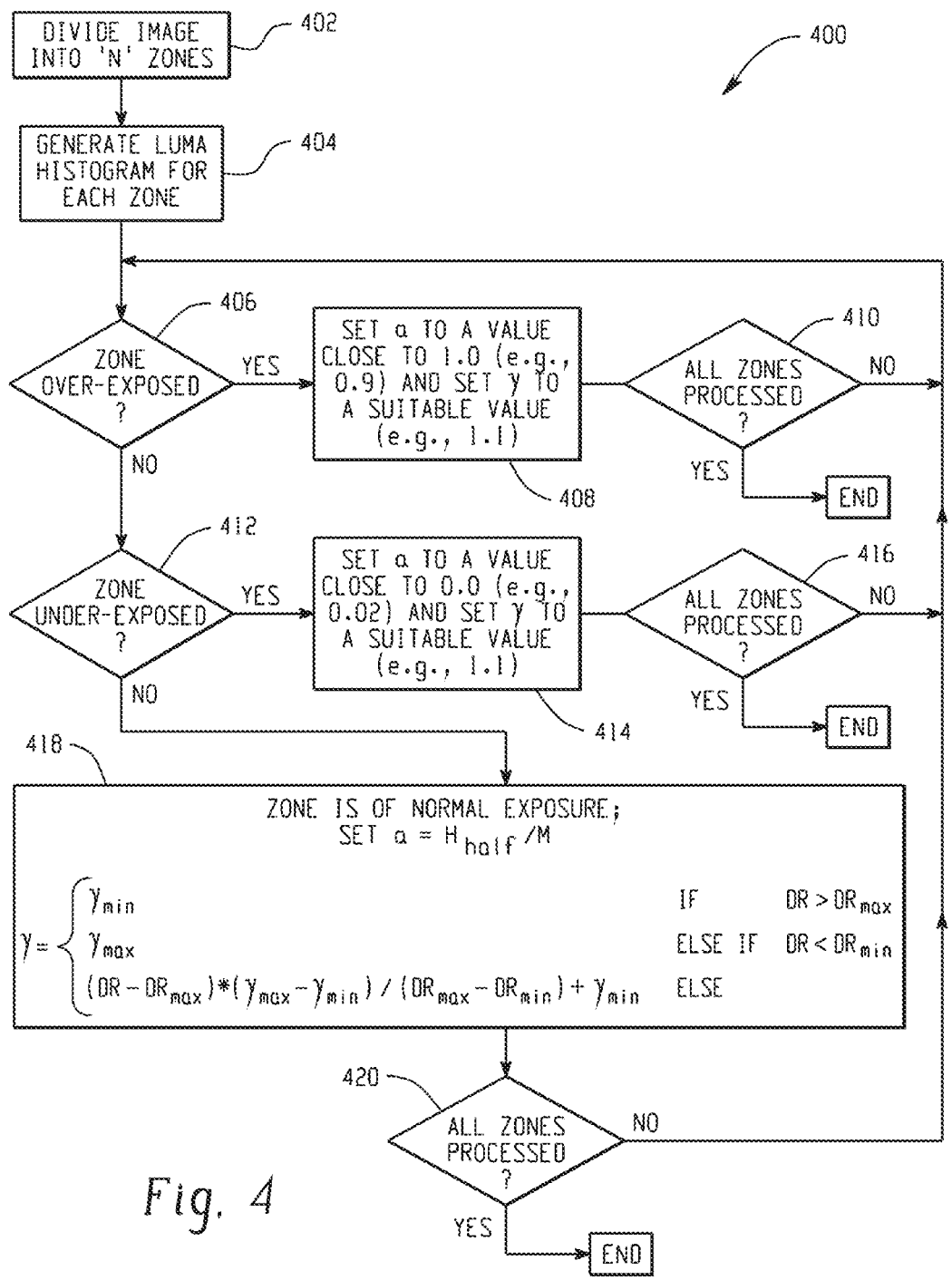
FIG. 4 is a flowchart of an example process for determining tone curves for each of the N zones of an image.

FIG. 4 is a flowchart 400 of an example process for determining tone curves for each of the N zones of an image. At 402, the input image is divided into N zones, and at 404, a luma histogram is generated for each of the N zones. To determine a tone curve for each of the N zones, subsequent steps of the flowchart 400 are performed. Specifically, for a first zone of the N zones, at 406, a determination is made as to whether the first zone is over-exposed. If the zone is over-exposed, at 408, a value a for a tone curve for the first zone is set to a value approximately equal to 1.0 (e.g., 0.9) and γ is set to a suitable value (e.g., 1.1). It should be understood that the parameters a and γ discussed herein with reference to FIG. 4 are the parameters for the tone curve included in Equation 1. At 410, a determination is made as to whether all zones of the N zones have been processed. If all zones have been processed, the process ends, and if all zones have not been processed, the flowchart returns to the determination at 406, and a determination is made as to whether a second zone of the N zones is over-exposed.

If it is determined at 406 that the first zone is not over-exposed, at 412, a determination is made as to whether the first zone is under-exposed. If the zone is under-exposed, at 414, the value a for the tone curve for the first zone is set to a value approximately equal to 0.0 (e.g., 0.02) and γ is set to a suitable value (e.g., 1.1). At 416, a determination is made as to whether all zones of the N zones have been processed. If all zones have been processed, the process ends, and if all zones have not been processed, the flowchart returns to the determination at 406, and a determination is made as to whether the second zone of the N zones is over-exposed.

If it is determined at 412 that the first zone is not under-exposed, at 418, the first zone is determined to be of normal exposure. Consequently, at 418, the parameters a and γ of the tone curve for the first zone are set as follows:

$$a = H_{half} / M_{luma},\qquad\text{(Equation 4)}$$

$$\gamma = \begin{cases} \gamma_{min} & \text{if } DR > DR_{max} \\ \gamma_{max} & \text{else if } DR < DR_{min} \\ (DR - DR_{max}) * (\gamma_{max} - \gamma_{min}) / (DR_{max} - DR_{min}) + \gamma_{min} & \text{else} \end{cases}\qquad\text{(Equation 5)}$$

Variables included in Equations 4 and 5 above (e.g., $H_{half}$, $M_{luma}$, $\gamma_{min}$, $\gamma_{max}$, DR, $DR_{max}$, $DR_{min}$) are described above with reference to FIG. 3. At 420, a determination is made as to whether all zones of the N zones have been processed. If all zones have been processed, the process ends, and if all zones have not been processed, the flowchart returns to the determination at 406, and a determination is made as to whether a second zone of the N zones is over-exposed.

FIG. 5A depicts an image 500 including pixels 502, 512, 526, 546, where tone-mapped values are determined for each of the pixels 502, 512, 526, 546 based on a sum of M weighted values. The image 500 is divided into zones, and in the example of FIG. 5A, the image 500 is divided up into a matrix of 8 zones×8 zones. Each of the zones of the image 500 has its own tone curve with corresponding a and γ parameters, with the a and γ parameters being set based on each zone's luma histogram statistics, as described above. After determining the tone curves for each of the zones of the image 500, tone-mapped values for each of the pixels in the image 500 are determined.

For each pixel in the image 500, the pixel's tone-mapped value is based on a sum of M weighted values. The M weighted values are determined by applying tone curves of M zones to a value of the pixel. Determining a single weighted value of the M weighted values includes i) applying to the value of the pixel a tone curve for a particular zone to determine a non-weighted value, and ii) weighting the non-weighted value based on a distance from the pixel to a center point of the particular zone and an intensity difference between the value of the pixel and an average pixel value of the particular zone. The applying and weighting steps are performed for each of the M zones to determine the M weighted values for the pixel. The M zones include a first zone of the 8 zone×8 zone matrix in which the pixel is located and one or more other zones of the 8 zone×8 zone matrix that are located within a neighborhood of the first zone.

To illustrate this approach to finding a tone-mapped output value for a pixel, FIG. 5A depicts a pixel 502 located within a zone 504 of the image 500. The determining of a tone-mapped value for the pixel 502 is based on a sum of M weighted values. For the pixel 502, M is equal to four, based on the neighborhood of zones 505 used in the calculation. The M weighted values are determined by applying tone curves of M zones to a value of the pixel 502. With M equal to four for the pixel 502, tone curves for the zones 504, 506, 508, 510 are applied to the value of the pixel 502. To determine a first weighted value of the M weighted values, a tone curve for the zone 504 is applied to the value of the pixel 502 to determine a first non-weighted value. The first non-weighted value is weighted based on i) a distance from the pixel 502 to a center point of the zone 504, and ii) an intensity difference between the value of the pixel 502 and an average pixel value of the zone 504. The weighting of the first non-weighted value yields the first weighted value of the M weighted values. Similarly, to determine a second weighted value of the M weighted values, a tone curve for the zone 506 is applied to the value of the pixel 502 to determine a second non-weighted value. The second non-weighted value is weighted based on a distance from the pixel 502 to a center point of the zone 506 and an intensity difference between the value of the pixel 502 and an average pixel value of the zone 506. The rest of the M weighted values for the pixel 502 are determined by repeating these steps for the remaining zones (i.e. zones 508 and 510). The tone-mapped value for the pixel 502 is determined based on a sum of the M weighted values.

In an example, the determining of the tone-mapped value for the pixel 502 is based on $$y(x) = \frac{\sum_{n=1}^{M}(T_n(x) * w1_n * w2_n)}{\sum_{n=1}^{M}(w1_n * w2_n)},\qquad\text{(Equation 6)}$$

where y is the tone-mapped value for the pixel 502, x is the original value of the pixel 502, $T_n$ is a tone curve for a zone n of the M zones 504, 506, 508, 510 defining the neighborhood 505, $w1_n$ is a distance weighting function based on a distance from the pixel 502 to a center point of the zone n, $w2_n$ is a similarity weighting function based on an intensity difference between the value of the pixel 502 and an average pixel value of the zone n.

In an example, the distance weighting function $w1_n$ is based on a first Gaussian function with values that vary based on the distance, and the similarity weighting function $w2_n$ is based on a second Gaussian function with values that vary based on the intensity difference. The first Gaussian function has values that decrease with increasing distance, such that a value of the distance weighting function $w1_n$ decreases as the distance between the pixel 502 and the center point of the zone n increases. Similarly, the second Gaussian function has values that decrease with increasing intensity difference, such that a value of the similarity weighting function $w2_n$ decreases as the intensity difference between the value of the pixel 502 and the average pixel value of the zone n increases.

In other examples, the distance weighting function $w1_n$ and the similarity weighting function $w2_n$ are not Gaussian functions and are instead other functions.

Tone-mapped values for other pixels of the image 500 are determined in a similar manner using Equation 6. When considering different pixels of the image 500, a neighborhood of zones used in making the calculation varies. For example, in calculating the tone-mapped value for the pixel 502, four zones are used, where the four zones include the zone 504 in which the pixel 502 is located and the three zones 506, 508, 510 located within the neighborhood 505 of the zone 504. By contrast, in calculating the tone-mapped value for the pixel 526, nine zones are used (i.e., M is equal to nine in Equation 6), where the nine zones include the zone 536 in which the pixel 526 is located and the eight zones 528, 530, 532, 534, 538, 540, 542, 544 located within a neighborhood 503 of the zone 536. In calculating the tone-mapped values for the pixels 512 and 546, six zones included within neighborhoods 507 and 509, respectively, are used.

Each of the neighborhoods of zones 503, 505, 507, 509 illustrated in FIG. 5A is considered to be a 3 zone×3 zone neighborhood. For the pixel 526 located within an interior of the image 500, all nine zones of the 3 zone×3 zone neighborhood 503 are used. By contrast, for the pixels 502, 512, 546 located near a periphery of the image 500, less than all nine zones of the 3 zone×3 zone neighborhood are used. Thus, special treatment is used in applying the 3 zone×3 zone neighborhood to pixels located near the edges of the image 500.

To further illustrate the variations in neighborhood size for calculating tone-mapped values for different pixels of an image, FIG. 5B depicts an image 560 with neighborhoods 568, 570, 572 used in calculating tone-mapped values for pixels 562, 564, 566, respectively. The image 560 is divided into an 8 zone×8 zone matrix, and each of the neighborhoods of zones 568, 570, 572 is considered to be a 5 zone×5 zone neighborhood. For the pixel 566 located within an interior of the image 560, all twenty-five zones of the 5 zone×5 zone neighborhood 572 are used (i.e., M is equal to twenty-five in Equation 6). By contrast, for the pixel 562 located near a corner of the image 560, only nine zones of the 5 zone×5 zone neighborhood 568 are used. Similarly, for the pixel 564 located near a top edge of the image 560, only fifteen zones of the 5 zone×5 zone neighborhood 570 are used. It should be understood that the features of FIGS. 5A and 5B are exemplary only. For example, although both FIGS. 5A and 5B illustrate dividing an image into an 8 zone×8 zone matrix, fewer zones or additional zones are used in other examples. Similarly, the 3×3 zone and 5×5 zone neighborhoods illustrated in these figures are examples only, and other neighborhood systems are used in other examples (e.g., neighborhoods of different sizes and/or shapes). In FIGS. 5A and 5B, the arrows extending from the pixels illustrate distances between the pixels and center points of the relevant zones.

FIG. 6 depicts an image 600 divided into N zones, where one of the N zones is determined to be a face zone 602. Determining a tone curve for each of the N zones of the image 600 includes determining whether the zone is over-exposed, under-exposed, or of normal exposure, where the determination is based on a normalized average luma value $YN_{avg}$ for the zone. Specifically, the value $YN_{avg}$ is compared to first and second threshold values overEx_thre and underEx_thre, respectively, to determine if the zone is over-exposed, under-exposed, or of normal exposure, as described above. As referred to herein, the threshold value overEx_thre is the over-exposed threshold value used in determining if the zone is over-exposed, and the threshold value underEx_thre is the under-exposed threshold value used in determining if the zone is under-exposed. However, if the zone is determined to include a face of a human being, then the overEx_thre and underEx_thre threshold values are modified in order to modify the tone curve parameters for the zone. Thus, in an example, the tone mapping methods described above are supplemented with face detection methods.

In implementing the face detection methods, it is determined, for each of the N zones of the image 600, if the zone includes a face of a human being. For each zone including the face, the under-exposed threshold value underEx_thre is selected differently to cause an increase in the brightness of the zone including the under-exposed face. Similarly, for each zone including the face, the over-exposed threshold value overEx_thre is selected differently based on the inclusion of the face in the zone. The $YN_{avg}$ is calculated for the zone based on the skin-tone pixel values included in the zone and compared to the modified threshold values for the zone. Additionally, for each zone including the detected face, the γ parameter of the tone curve (e.g., as used in the S-shaped tone curve defined in Equation 1) is set to approximately 1.0 to avoid the enhancement of the contrast in the face.

Figure 7:
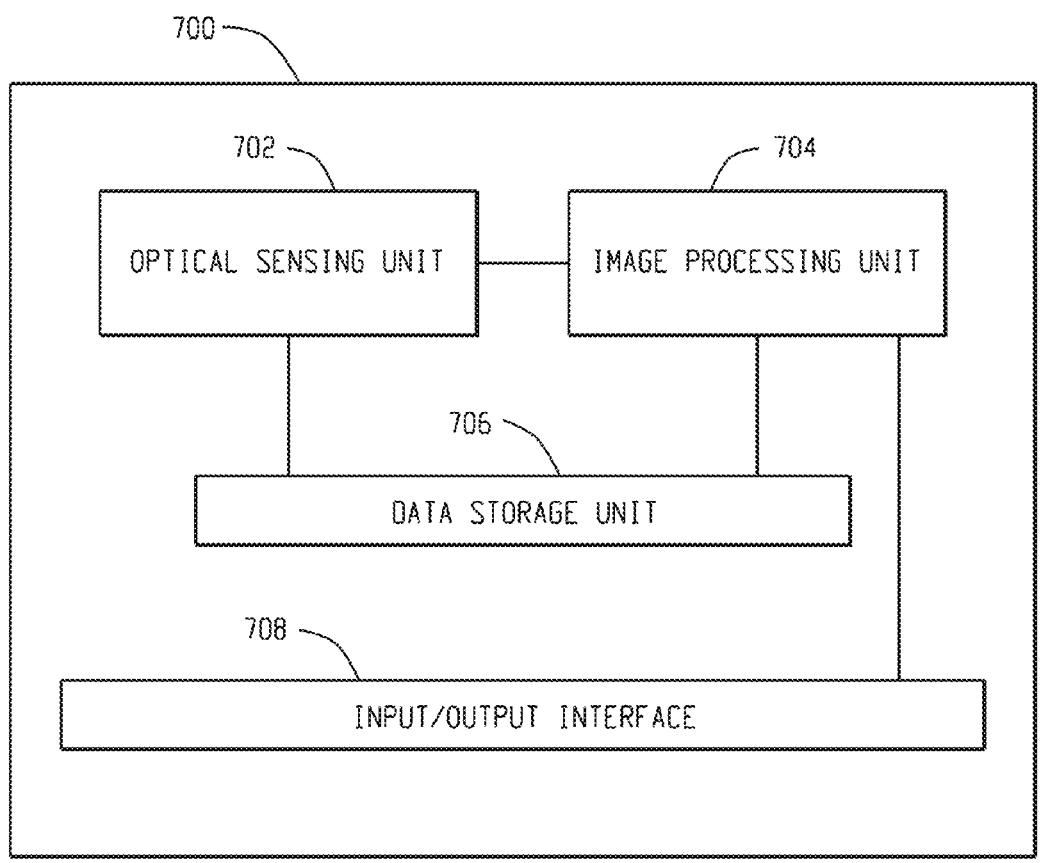
FIG. 7 is a block diagram of an example imaging device that includes an image processing unit configured to perform image processing according to the approaches described herein.

FIG. 7 is a block diagram of an example imaging device 700 that includes an image processing unit 704 configured to perform image processing according to the approaches described herein. Embodiments of the example imaging device shown in FIG. 7 are included in stand-alone digital cameras and in digital cameras embedded in other electronic devices, such as cellular phones, laptop computers, and handheld personal computing devices. As shown in FIG. 7, example imaging device 700 includes an optical sensing unit 702, an image processing unit 704, a data storage unit 706, and an input/output interface 708. In other examples, the example imaging device 700 further includes memory (e.g., as part of the data storage unit 706, the input/output interface 708, or as a standalone component) and a bus that connects one or more of the components 702, 704, 706, 708.

The components of the imaging device 700 are configured to provide image acquisition and tone mapping. In providing the image acquisition, the optical sensing unit 702 includes a pixel array or other components used to form a complementary metal-oxide-semiconductor (CMOS) image sensor or charge-coupled device (CCD) image sensor. In providing the tone mapping, the image processing unit 704 includes one or more processors for processing image pixel output signals that are generated by the optical sensing unit 702. The one or more processors of the image processing unit 704 obtain the pixel output signals and perform procedures to adjust the pixel output signals as necessary for the tone mapping.

The data storage unit 706 and memory are configured to hold persistent and non-persistent copies of computer code and data. The computer code includes instructions that when accessed by the image processing unit 704 result in the imaging device 700 performing the tone mapping operations as described above. The data includes data to be acted upon by the instructions of the code, and in an example, the data includes stored pixel output signals and/or digital images formed by the pixel output signals. The processing unit 704 includes one or more single-core processors, multiple-core processors, controllers, or application-specific integrated circuits (ASICs), among other types of processing components. The memory includes random access memory (RAM), dynamic RAM (DRAM), static RAM (SRAM), synchronous DRAM (SDRAM), or dual-data rate RAM (DDRRAM), among other types of memory.

The data storage unit 706 includes integrated or peripheral storage devices, such as, but not limited to, disks and associated drives (e.g., magnetic, optical), USB storage devices and associated ports, flash memory, read-only memory (ROM), or non-volatile semiconductor devices, among others. In an example, data storage unit 706 is a storage resource physically part of the imaging device 700, and in another example, the data storage unit 706 is accessible by, but not a part of, the imaging device 700. The input/output interface 708 includes interfaces designed to communicate with peripheral hardware (e.g., remote optical imaging sensors or other remote devices). In various embodiments, imaging device 700 has more or less elements or a different architecture.

Figure 8:
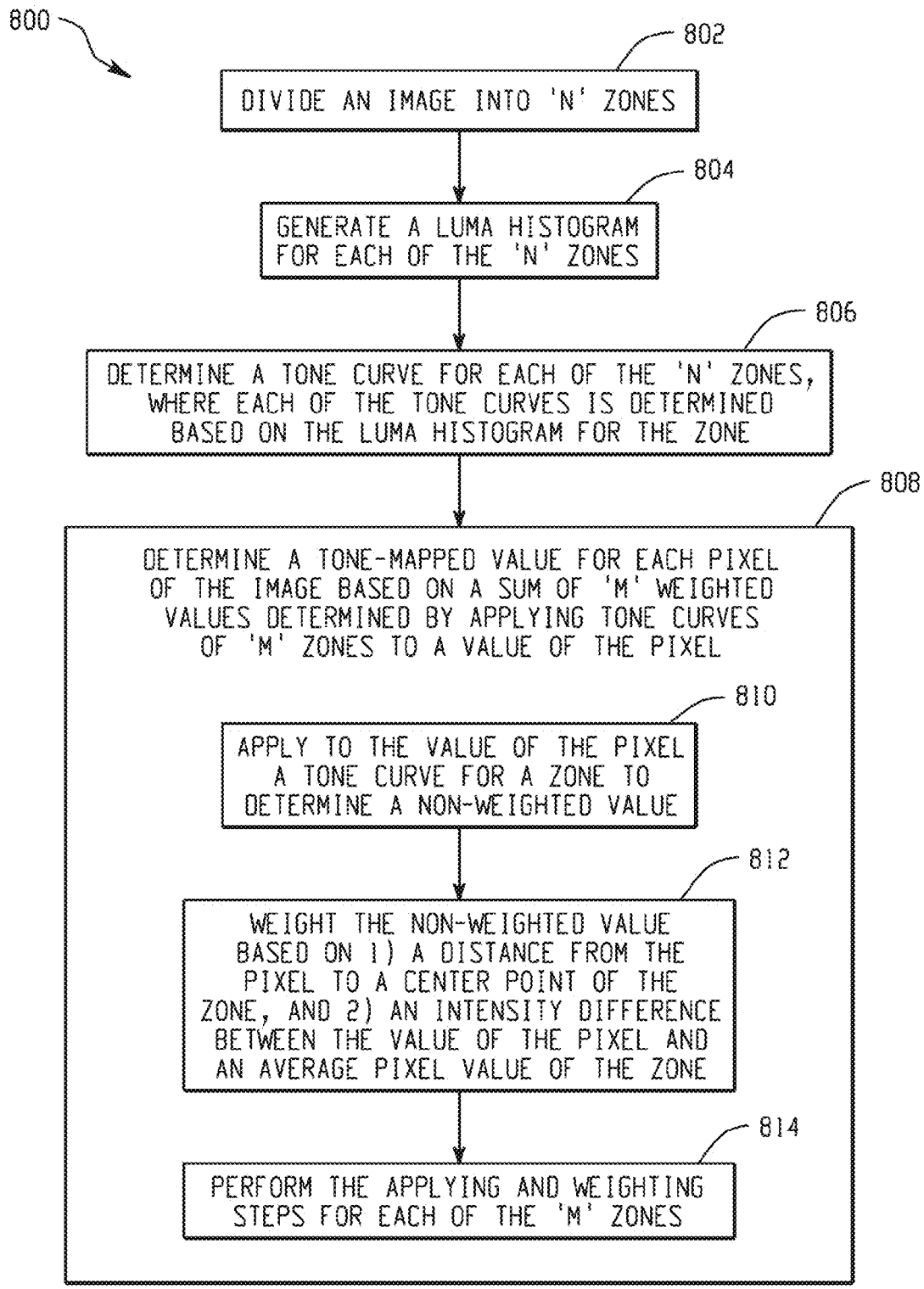
FIG. 8 is a flowchart illustrating an example method of processing an image according to the approaches described herein.

FIG. 8 is a flowchart 800 illustrating an example method of processing an image according to the approaches described herein. At 802, an image is divided into N zones. At 804, a luma histogram is generated for each of the N zones. At 806, a tone curve for each of the N zones is determined, where each of the tone curves is determined based on the luma histogram for the zone. At 808, a tone-mapped value is determined for each pixel of the image based on a sum of M weighted values determined by applying tone curves of M zones to a value of the pixel. Determining the M weighted values includes, at 810, applying to the value of the pixel a tone curve for a zone to determine a non-weighted value. Determining the M weighted values further includes, at 812, weighting the non-weighted value based on i) a distance from the pixel to a center point of the zone, and ii) an intensity difference between the value of the pixel and an average pixel value of the zone. At 814, the applying and weighting steps are performed for each of the M zones to determine the M weighted values for the pixel. The M zones include a first zone in which the pixel is located and one or more other zones located within a neighborhood of the first zone.

This written description uses examples to disclose the invention, including the best mode, and also to enable a person skilled in the art to make and use the invention. The patentable scope of the invention includes other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method of processing an image, the method comprising:

dividing an image into N zones; and for each respective zone of the N zones, calculating a normalized average luma value ($YN_{avg}$) for the respective zone as an average luma value of the zone normalized by a maximum luma value of the image, determining an exposure level for the respective zone, by determining that the exposure level is (i) over-exposure if $YN_{avg}$ is greater than an upper threshold, (ii) under-exposure if $YN_{avg}$ is less than a lower threshold, and (iii) normal exposure if $YN_{avg}$ is neither greater than the upper threshold nor less than the lower threshold, and setting parameters of a tone curve for the respective zone based on the determined exposure level; and for each respective pixel of multiple pixels of the image, applying the tone curve of each zone of M zones of the N zones to the respective pixel to yield M tone-mapped values, wherein M is equal to or less than N, weighting each M tone-mapped value with a weighting factor to yield M weighted tone-mapped values, and calculating a weighted-sum value for the respective pixel as a sum of the M weighted tone-mapped values.

2. The method of claim 1, wherein for each respective zone, the weighting factor is based on i) a distance from the respective pixel to a center point of the respective zone, and ii) an intensity difference between the value of the respective pixel and an average pixel value of the respective zone.

3. The method of claim 1, wherein the tone curve for each respective zone is based on $$\begin{cases} y = a^{1-\gamma}x^{\gamma}, & 0 \le x \le a, \\ y = 1 - (1-a)^{1-\gamma}(1-x)^{\gamma}, & a < x \le 1 \end{cases},$$

where x is the value of the pixel to which the tone curve is applied, y is an output value of the tone curve, and a and γ are the parameters of the tone curve set based on the determination that the respective zone is over-exposed, under-exposed, or of normal exposure.

4. The method of claim 3 comprising:

if the respective zone is of normal exposure:

determining a value DR from a histogram of the respective zone, wherein DR is a difference between $H_{low}$ and $H_{high}$, wherein $H_{low}$ is a q-percentile luma value that is less than $H_{half}$, and $H_{high}$ is a (100−q)-percentile luma value, and wherein determining of whether the zone has a wide dynamic range, a narrow dynamic range, or a normal dynamic range is based on the value DR;

determining that the zone has the wide dynamic range and setting γ equal to $γ_{min}$ if DR is greater than $DR_{max}$, $DR_{max}$ being a maximum threshold value for DR and $γ_{min}$ being a minimum value for γ;

determining that the zone has the narrow dynamic range and setting γ equal to $γ_{max}$ if DR is less than $DR_{min}$, $DR_{min}$ being a minimum threshold value for DR and $γ_{max}$ being a maximum value for γ; and determining that the zone has a normal dynamic range and setting γ equal to $$\frac{(DR - DR_{max}) * (γ_{max} - γ_{min})}{(DR_{max} - DR_{min})} + γ_{min},$$

if the zone is not determined to have the wide dynamic range and not determined to have the narrow dynamic range.

5. The method of claim 1 comprising:
determining, for each of the N zones, if the zone includes a face of a human being; and
modifying the tone curve for each of the N zones determined to include the face.

6. The method of claim 1,
wherein in the determining of the tone-mapped value for a first pixel of the image, M is equal to N, and
wherein in the determining of the tone-mapped value for a second pixel of the image, M is less than N.

7. The method of claim 1,
wherein in the determining of the tone-mapped value for a first pixel of the image, M is equal to a first value, the first pixel being in a zone that is located at a boundary of the image,
wherein in the determining of the tone-mapped value for a second pixel of the image, M is equal to a second value, the second pixel being in a zone that is not located at the boundary of the image, and wherein the second value is not equal to the first value.

8. A method of processing an image, the method comprising:
dividing an image into N zones and generating a histogram for each of the N zones;
determining a tone curve for each of the N zones, wherein each of the tone curves is determined based on the histogram for the zone; and
determining a tone-mapped value for each pixel of the image based on a sum of M weighted values determined by applying tone curves of M zones to a value of the pixel;
wherein the determining of the tone-mapped value for each pixel is based on $$y(x) = \frac{\sum_{n=1}^{M}(T_n(x) * w1_n * w2_n)}{\sum_{n=1}^{M}(w1_n * w2_n)},$$

where y is the tone-mapped value, x is the value of the pixel, $T_n$, is a tone curve for a zone n of the M zones, $w1_n$ is a distance weighting function based on a distance from the pixel to a center point of the zone n, $w2_n$ is a similarity weighting function based on an intensity difference between the value of the pixel and an average pixel value of the zone n, wherein the distance weighting function and the similarity weighting function are based on Gaussian functions.

9. An imaging device comprising:
a pixel array; and
a processor for processing an image received from the pixel array, the processor being configured to:
divide the image into N zones; and
for each respective zone of the N zones,
calculate a normalized average luma value ($YN_{avg}$) for the respective zone as an average luma value of the zone normalized by a maximum luma value of the image,
determine an exposure level for the respective zone, by determining that the exposure level is (i) over-exposure if $YN_{avg}$ is greater than an upper threshold, (ii) under-exposure if $YN_{avg}$ is less than a lower threshold, and (iii) normal exposure if $YN_{avg}$ is neither greater than the upper threshold nor less than the lower threshold, and
set parameters of a tone curve for the respective zone based on the determined exposure level; and
for each respective pixel of multiple pixels of the image,
apply the tone curve of each zone of M zones of the N zones to the respective pixel to yield M tone-mapped values, wherein M is equal to or less than N,
weight each M tone-mapped value with a weighting factor to yield M weighted tone-mapped values, and
calculate a weighted-sum value for the respective pixel as a sum of the M weighted tone-mapped values.

10. The imaging device of claim 9, wherein for each respective zone, the weighting factor is based on i) a distance from the respective pixel to a center point of the respective zone, and ii) an intensity difference between the value of the respective pixel and an average pixel value of the respective zone.

11. The imaging device of claim 9, wherein the tone curve for the zone is based on $$\begin{cases} y = a^{1-γ}x^γ, & 0 \le x \le a, \\ y = 1 - (1-a)^{1-γ}(1-x)^γ, & a < x \le 1 \end{cases},$$

where x is the value of the pixel to which the tone curve is applied, y is an output value of the tone curve, and a and γ are the parameters of the tone curve set based on the determination that the zone is over-exposed, under-exposed, or of normal exposure.

12. The imaging device of claim 11, wherein the processor is further configured to:
if the zone is of normal exposure:
determine a value DR from a histogram of the respective zone, wherein DR is a difference between $H_{low}$ and $H_{high}$, wherein $H_{low}$ is a q-percentile luma value that is less than $H_{half}$, and $H_{high}$ is a (100−q)-percentile luma value, and wherein determining of whether the zone has a wide dynamic range, a narrow dynamic range, or the a normal dynamic range is based on the value DR;
determine that the zone has the wide dynamic range and setting γ equal to $γ_{min}$ if DR is greater than $DR_{max}$, $DR_{max}$ being a maximum threshold value for DR and $γ_{min}$ being a minimum value for γ;

determine that the zone has the narrow dynamic range and setting γ equal to $\gamma_{max}$ if DR is less than $DR_{min}$, $DR_{min}$ being a minimum threshold value for DR and $\gamma_{max}$ being a maximum value for γ; and determine that the zone has a normal dynamic range and setting γ equal to $$\frac{(DR - DR_{max}) * (\gamma_{max} - \gamma_{min})}{(DR_{max} - DR_{min})} + \gamma_{min},$$

if the zone is not determined to have the wide dynamic range and not determined to have the narrow dynamic range.

13. The imaging device of claim 9, wherein the processor is configured to:
    - determine, for each of the N zones, if the zone includes a face of a human being; and
    - modify the tone curve for each of the N zones determined to include the face.

14. The imaging device of claim 9,
    wherein in the determining of the tone-mapped value for a first pixel of the image, M is equal to N, and
    wherein in the determining of the tone-mapped value for a second pixel of the image, M is less than N.

15. The imaging device of claim 9,
    wherein in the determining of the tone-mapped value for a first pixel of the image, M is equal to a first value, the first pixel being in a zone that is located at a boundary of the image,
    wherein in the determining of the tone-mapped value for a second pixel of the image, M is equal to a second value, the second pixel being in a zone that is not located at the boundary of the image, wherein the second value is not equal to the first value.

16. An imaging device comprising:
    a pixel array; and
    a processor for processing an image received from the pixel array, the processor being configured to:
    divide the image into N zones and generate a histogram for each of the N zones;
    determine a tone curve for each of the N zones, wherein each of the tone curves is determined based on the histogram for the zone; and
    determine a tone-mapped value for each pixel of the image based on a sum of M weighted values determined by applying tone curves of M zones to a value of the pixel;
    wherein the determining of the tone-mapped value for each pixel is based on $$y(x) = \frac{\sum_{n=1}^{M} (T_n(x) * w1_n * w2_n)}{\sum_{n=1}^{M} (w1_n * w2_n)},$$

where y is the tone-mapped value, x is the value of the pixel, $T_n$ is a tone curve for a zone n of the M zones, $w1_n$ is a distance weighting function based on a distance from the pixel to a center point of the zone n, $w2_n$ is a similarity weighting function based on an intensity difference between the value of the pixel and an average pixel value of the zone n, wherein the distance weighting function and the similarity weighting function are based on Gaussian functions.

\* \* \* \* \*